United States Patent
Hogan, Jr.

(10) Patent No.: US 6,233,102 B1
(45) Date of Patent: May 15, 2001

(54) POINT-OF-PURCHASE DISPLAY

(76) Inventor: Veigh E. Hogan, Jr., 32 Beacon Hill La., Creve Coeur, MO (US) 63141

( * ) Notice: Subject to any disclaimer, the term of this patent is extended or adjusted under 35 U.S.C. 154(b) by 0 days.

(21) Appl. No.: 09/532,133

(22) Filed: Mar. 21, 2000

(51) Int. Cl.$^7$ ................................................. G02B 7/02
(52) U.S. Cl. ................................. 359/802; 359/822
(58) Field of Search .................................. 359/802, 803, 359/804, 806, 809, 819, 822, 805; 40/427, 493, 494, 661

(56) References Cited

U.S. PATENT DOCUMENTS

| | | | |
|---|---|---|---|
| 354,976 | 12/1886 | Field | 248/484 |
| 1,059,868 | 4/1913 | Harrison | 359/805 |
| 1,783,278 | 12/1930 | Brady | 248/207 |
| 3,313,054 | 4/1967 | Madey | 40/10 |
| 3,753,610 | 8/1973 | Samuel | 350/248 |
| 3,943,648 * | 3/1976 | Sterne | 40/106.51 |
| 4,016,977 | 4/1977 | Krautsack | 206/526 |
| 4,420,082 | 12/1983 | Bernie | 206/526 |
| 4,457,585 | 7/1984 | DuCorday | 350/235 |
| 4,572,380 | 2/1986 | Langwell | 211/57.1 |
| 5,245,477 | 9/1993 | Nyman | 359/818 |
| 5,344,250 | 9/1994 | Kringel et al. | 403/228 |
| 5,472,289 | 12/1995 | Kringel et al. | 403/228 |
| 5,610,770 | 3/1997 | Galiani | 359/807 |
| 5,695,346 * | 12/1997 | Sekiguchi et al. | 434/365 |
| 5,847,883 | 12/1998 | Rispoli, Sr. | 359/802 |
| 5,999,336 | 12/1999 | Yang, Jr. | 359/742 |

* cited by examiner

Primary Examiner—Ricky Mack
(74) Attorney, Agent, or Firm—Grace J. Fishel

(57) ABSTRACT

A point-of-purchase display featuring a fresnel lens in a frame attached to an advertising display device. The advertising display device includes a place for signage and is adapted for attachment to the top or bottom of a store shelf, or into a price channel along the front edge. The fresnel lens is of low magnification such that when a small package or container with printed matter is viewed through the lens it can be seen with both eyes, in its entirety.

10 Claims, 5 Drawing Sheets

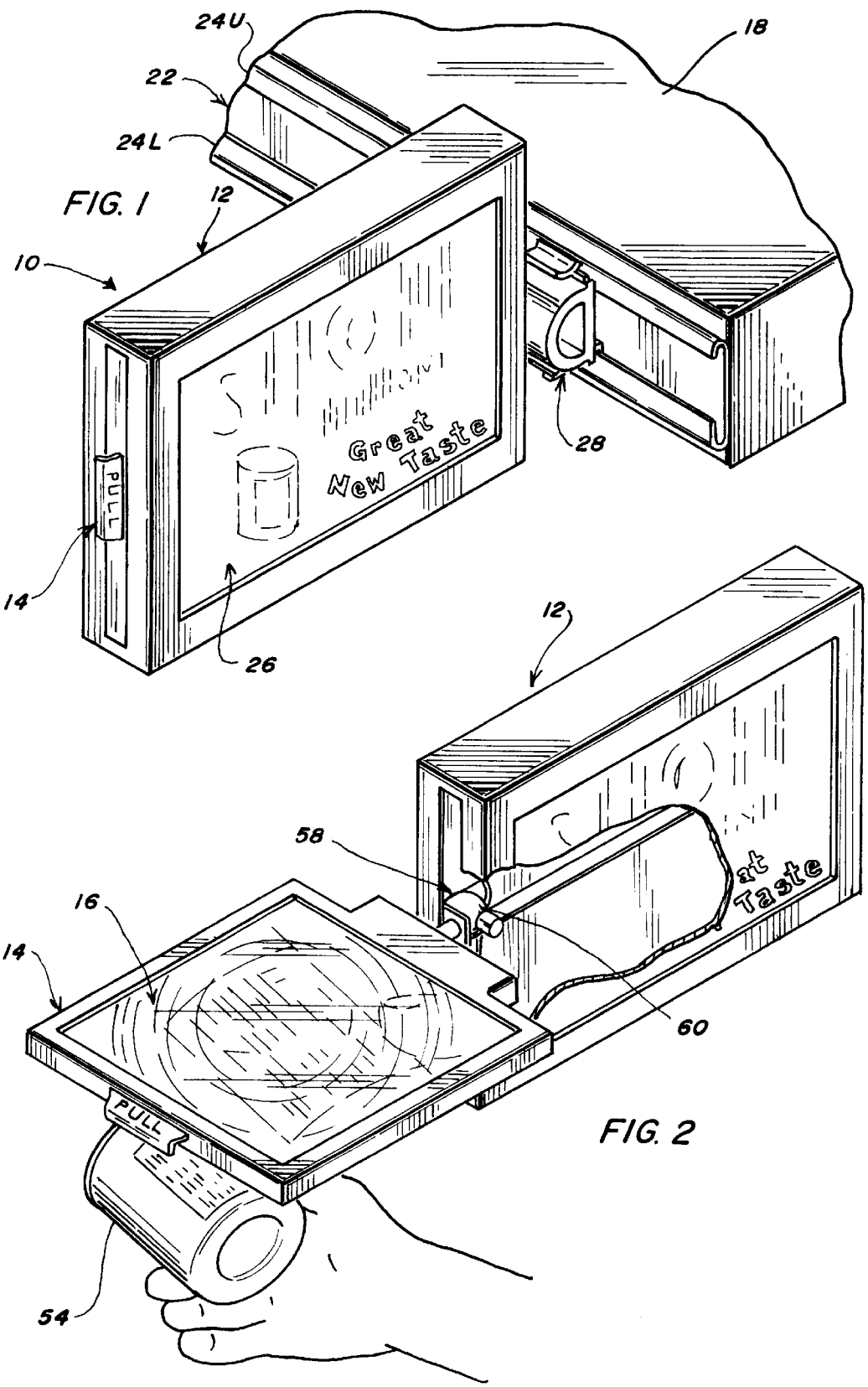

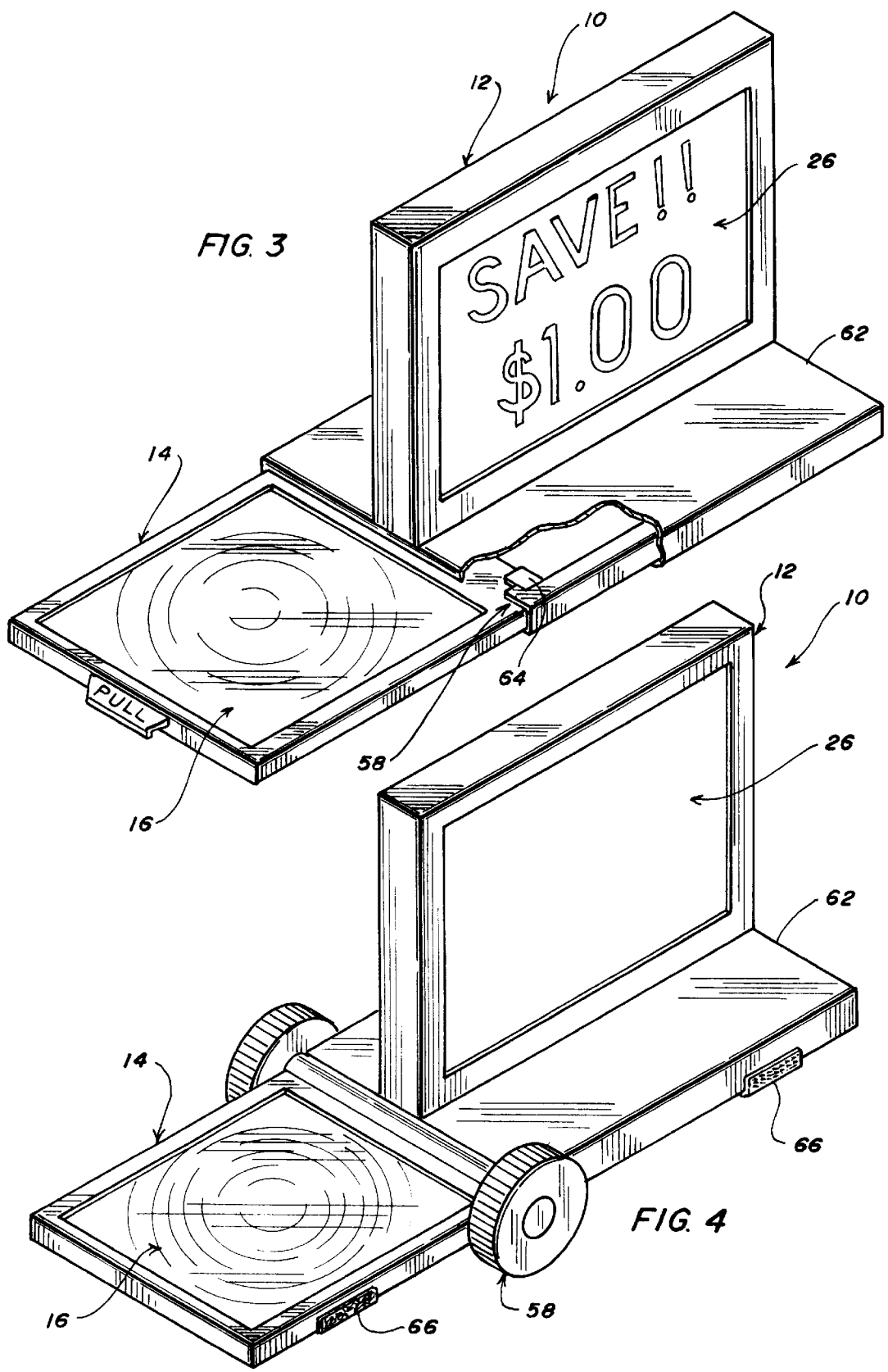

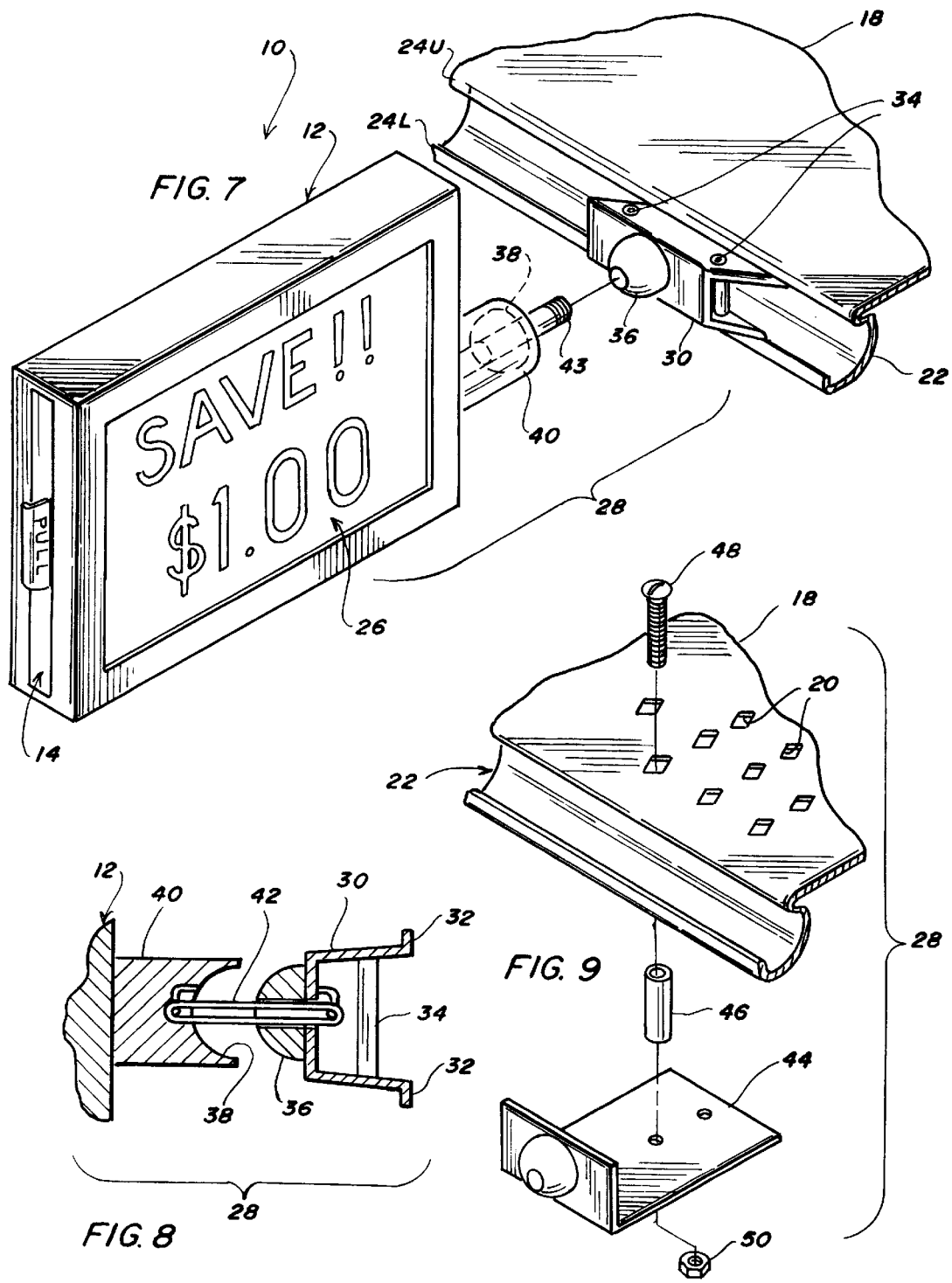

POINT-OF-PURCHASE DISPLAY

BACKGROUND OF THE INVENTION

1. Field of the Invention

The present invention relates to a point-of-purchase display with a fresnel lens magnifier for promoting products and providing information.

2. Brief Description of the Prior Art

It is common practice, especially in retail establishments, to display advertising material in high traffic flow locations for the purpose of catching the eye of the customer. An area of high traffic flow in any retail location is in the aisles between the display shelves.

Various point-of-purchase displays have been developed for attachment to the top or bottom of display shelves or to a price channel at the front of the shelf. Some point-of-purchase displays are static, dispense a coupon, wiggle or have flashing lights. Once the customer has seen a point-of-purchase display several times, he or she may walk by it without actually "seeing" so there is always a need for something different to catch the customer's attention. Another way to sustain interest in the advertisement would be if the point-of-purchase display provided a benefit to the customer, other than dispensing a coupon. It is to this marketing opportunity that the present invention is addressed.

Some non-prescription drugs, nutriceuticals, food supplements, and the like are sold in small containers. The label on these containers of necessity is small and the label is difficult to read, particularly for persons approaching or passed middle age. Presbyopia is a form of farsightedness which nearly universally affects the ability of a forty-plus person to see fine print clearly, caused by a diminished elasticity of the crystalline lens. While such persons may have eyeglasses for reading, often times they do not carry their glasses with them and even those middle aged persons who must wear glasses all the time may have difficulty reading fine print. This age group, however, purchases many (or possibly most) non-prescription drugs, nutriceuticals, food supplements and so forth.

U.S. Pat. No. 5,245,477 to Nyman proposes the attachment of an open-bottomed box with a glass magnifying lens in its top wall to a store shelf for use in magnifying the print on a small package. The field of view in Nyman's device is small because large glass lenses are expensive and the image is distorted, unlike a fresnel lens. The lighting on the product is also reduced as the sidewalls of the box block the light. In addition, the device is dangerous as a customer might be hurt by pieces of glass if he or she falls against the device and breaks the lens.

Inexpensive, plastic fresnel lenses, which are more convenient to carry than glass lenses, may be used to magnify the print on a small container. The AARP, for example, has given such devices to their members. Like eyeglasses, however, the customer may forget to bring a lens with him or her or the lens may become damaged when it is carried in a pocket or purse. Another important factor is vanity.

A point-of-purchase display with a large fresnel lens for magnifying the fine print on small packages of drugs, nutriceuticals, food supplements, etc. would be a benefit to the customer, if provided at the point where the need arises. The display would include a place for signage with information about the product and the magnifying device would allow the customer to read the fine print on the label, without drawing attention to him- or herself. On subsequent visits, the point-of-purchase display would continue to be of interest because the display provides a benefit to the consumer. While the customer might use the device to read the label on another or even a competing product, he or she cannot totally avoid being influenced by the sponsor's advertising message.

BRIEF SUMMARY OF THE INVENTION

In view of the above, it is an object of the present invention to provide a point-of-purchase display with a fresnel magnifier for use in magnifying the print on small containers and packages of goods. It is another object to provide a point-of-purchase display that generates goodwill with customers by providing a benefit. Other objects and features of the invention will be in part apparent and in part pointed out hereinafter.

In accordance with the invention, a point-of-purchase display includes an advertising display device adapted for attachment to a store shelf, a fresnel lens in a frame for magnifying printed matter on a package with the fresnel lens between the printed matter and a viewer, and a means for mounting the frame on the advertising display device such that the frame is generally parallel to the shelf and angled towards a viewer in use. In a preferred embodiment the fresnel lens has a first smooth side nearest the eyes of a viewer and an under-surface formed with prismatic grooves nearest the printed matter being magnified. It is also preferred that the fresnel lens magnifies the package such that the entire package can be seen within the fresnel lens. In other embodiments, the means for mounting the frame on the advertising display device also provides for movement between a first stored position and a second in-use position.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is a perspective view of a point-of-purchase display in accordance with the present invention shown mounted on a shelf with a fresnel lens magnifier in a stored position;

FIG. 2 is a perspective view of the first point-of-purchase display as shown in FIG. 1 but with the mounting mechanism for attaching the display to a shelf omitted and with the fresnel lens magnifier in an in-use position;

FIG. 3 is a perspective view similar to FIG. 2 of a second point-of-purchase display;

FIG. 4 is a perspective view similar to FIG. 2 of a third point-of-purchase display;

FIG. 7 is an exploded perspective view of a point-of-purchase display as shown in FIGS. 1–2 but with a second mounting mechanism for attaching the display to a shelf;

FIG. 8 is an exploded longitudinal cross-section on an enlarged scale of the mounting mechanism shown in FIG. 7 with a different elastic member;

FIG. 9 is an exploded view of a third mounting mechanism for attaching a point-of-purchase display to a shelf;

DETAILED DESCRIPTION OF THE INVENTION

Figure 5:
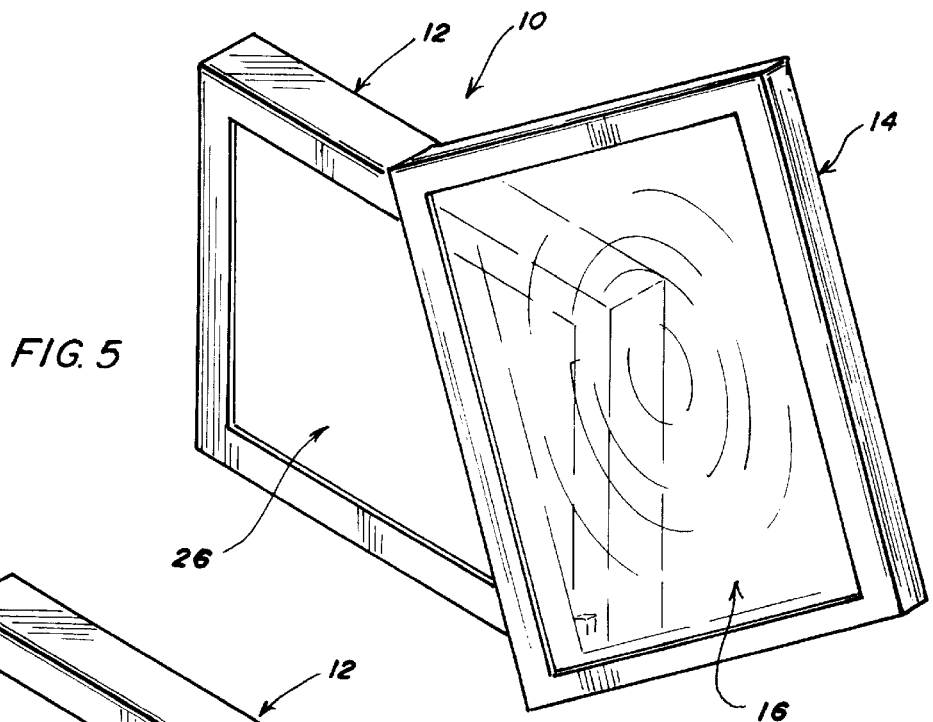
FIG. 5 is a perspective view of a fourth point-of-purchase display with the mounting mechanism for attaching the display to a shelf omitted and with a fresnel lens magnifier partially rotated into an in-use position.

Referring to the drawings more particularly by reference character, reference numeral 10 refers to a point-of-purchase display in accordance with the present invention. Point-of-purchase display 10 comprises an advertising display device 12 on which is mounted a frame 14 with a fresnel lens 16. Advertising display device 12 is mounted along the top or bottom of a store shelf 18 frequently through an array of holes 20 provided in the shelf, or in a price channel 22 provided at the front of the shelf. Price channel 22 has upper and lower opposing flanges 24U, 24L into which advertising display device 12 is inserted. A unifying feature of all advertising display devices 12 is that they are attached to store shelf 18 and include a place for signage 26.

When point-of-purchase display 10 is to remain in place for long periods of time, advertising display device 12 should be able to withstand being repeatedly bumped and manipulated. Unless advertising display device 12 is resilient and durable, it may not be able to withstand even accidental abuse and remain in place on the shelf for the full duration of the promotional program. One suitable mounting mechanism 28 for firm, durable, and resilient attachment of advertising display device 12 to a price channel is shown in FIG. 1 and described in U.S. Pat. Nos. 5,289,652 and 5,472,289. It will be understood that other mechanisms 28 which are now in existence or which become available that clip into price channel 22 and are sufficiently anchored are also suitable for use in the present invention. One such mechanism is shown in FIGS. 7–8. Advertising display device 12 in this instance includes a U-shaped member 30 with outwardly directed feet 32. Feet 32 are wedged into price channel 22 with set screws 34 which spread U-shaped member 30. Attached to the bight of U-shaped member 30 is a hemispherical ball 36 which is received in a correspondingly shaped recess 38 in a stem 40 of sign 26. The joint between ball 36 and recess 38 is maintained by an elastic band 42 as shown in FIG. 8 and a rubber bolt 43 as shown in FIG. 7.

Figure 10:
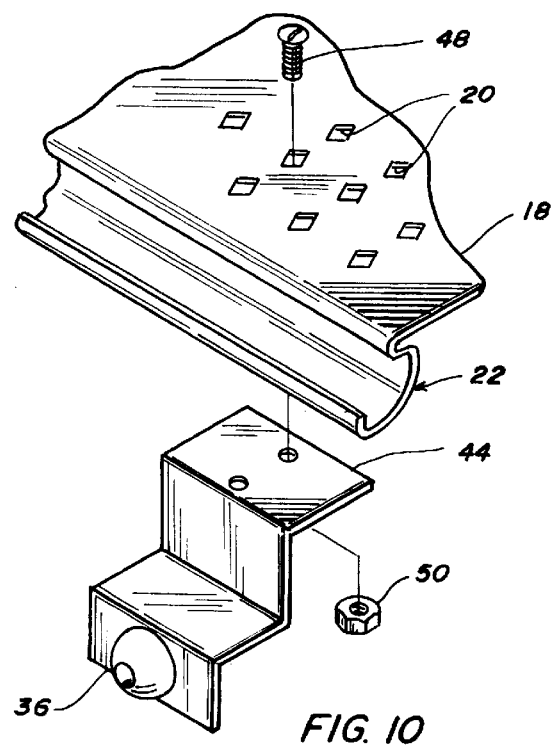
FIG. 10 is an exploded view of a fourth mounting mechanism for attaching a point-of-purchase display to a shelf; and, FIG. 11 is a perspective view of a fifth point-of-purchase display with a fresnel lens magnifier in permanent in-use position.

Other mounting mechanisms 28 are shown in FIGS. 9–10 wherein a bracket 44 is bolted through one of holes 20 in shelf 18. In FIG. 9, bracket 44 is L-shaped with a spacer sleeve 46 provided on a bolt 48 for mounting the bracket parallel with shelf 18 by tightening a nut 50 on bolt 48. In FIG. 10, bracket 44 is Z-shaped, obviating the need for a sleeve as required in the embodiment shown in FIG. 9. Another style of advertising display device 12 is shown in FIG. 1 wherein a channel member 52 grips the top and bottom of store shelf 18. A bight of channel member 52 along the front edge of the shelf may include a price channel into which may be slipped a sign 26. A top surface of channel member 52, along the top of the shelf, may also be used for signage.

Fresnel lens 16 is formed of a light-weight plastic material preferably with a smooth, flat viewing surface nearest the eyes of the user and an under-surface formed with prismatic grooves nearest the printed matter on a small container or package 54 being observed. The lens magnifies the fine print on container 54 when viewed from the smooth surface. Fresnel lens 16 will also magnify the writing when viewed from the opposite side but it is preferred that the lens be oriented such that the smooth, flat side is towards the user so that the prismatic grooves are protected from damage. Standard plastic materials for fresnel lens 16 include acrylic, polycarbonate and rigid vinyl. Rigid vinyl has a number of characteristics which make it both affordable and very suitable for use in the present invention. It has a high index of refraction; it is reasonably inexpensive; and it can be die-cut. Rigid vinyl is also naturally fire-retardant.

Fresnel lens 16 is supported by frame 14 and is preferably rectangular but other shapes of lenses may be used. Unlike an ordinary spherical glass lens, fresnel lens 16 does not distort the magnified image (i.e., a rectangular grid remains a rectangular grid after magnification). This makes it easier for a user to read small print, whereas a spherical lens warps the image. Fresnel lens 16 is mounted on advertising display device 12 such that frame 14 is generally parallel to shelf 18, substantially horizontal, and angled towards the viewer in use. It is preferred that fresnel lens 16 be large enough that the entire package (or label), four inches or less in length, be visible through the lens with both eyes so that the view is stereoscopic. It is therefore preferred that the lens magnify the fine print only slightly, perhaps as little as 1.2 or 1.5×. To see the entire package with this degree of magnification, the lens must therefore be 1.2 or 1.5 times the size of the object in both length and width.

Figure 6:
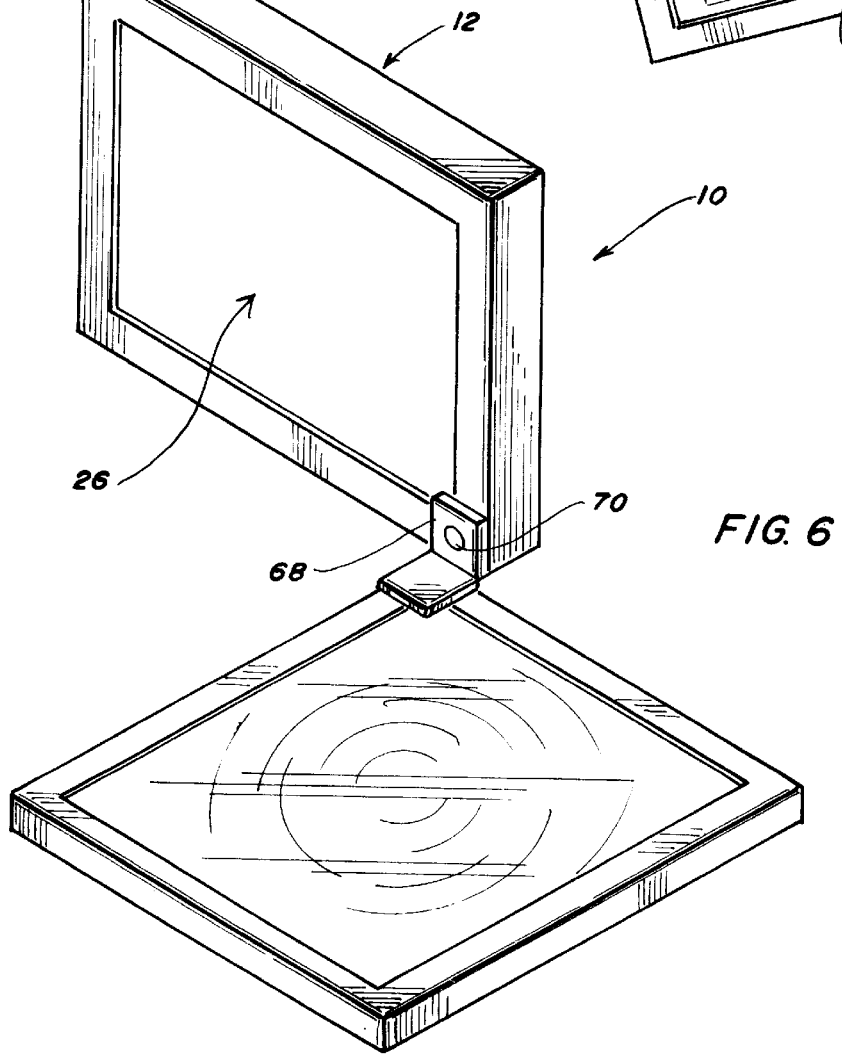
FIG. 6 is a perspective view of the fourth point-of-purchase display as shown in FIG. 5 but with the fresnel lens magnifier in an in-use position.
Figure 11:
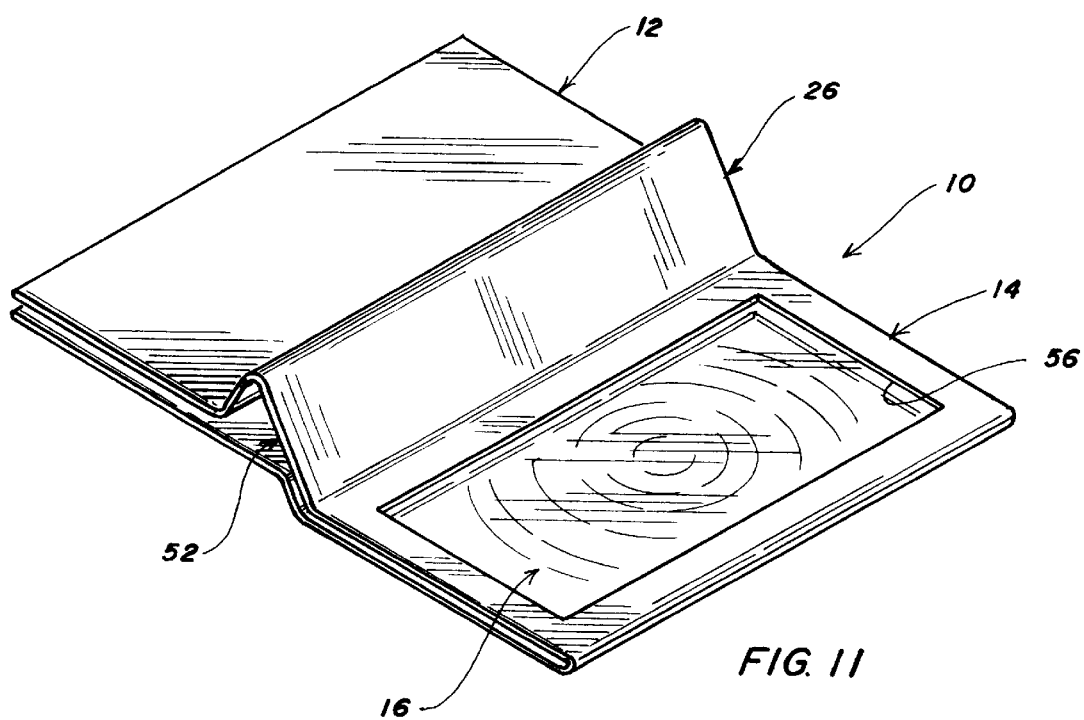

Frame 14 may be rigidly mounted on advertising display device 12 as shown in FIG. 11 wherein frame is an extension to channel member 52 and formed as a continuous portion thereof. A window 56 may be cut into the extension within which fresnel lens 16 is slipped or the lens may be viewed through the extension. In this advertising display device 12, frame 14 always is in an in-use position, angled towards the viewer. When the viewer holds a package or label below frame 14, the plane of the fine print should be generally parallel with the plane of fresnel lens 16. In other embodiments, as shown in FIGS. 1–2, a means 58 for mounting frame 24 to advertising display device 12 permits the frame to be moved between a first stored position (FIG. 1) and a second in-use position (FIG. 2). In this embodiment, frame 14 is received in a slot in sign 26 attached to mounting mechanism 28. A ball joint 60 permits frame 14 to be rotated between a vertical, stored position and a horizontal, in-use position. A stored and in-use position for frame 14 may be provided as shown in FIGS. 3–4 wherein sign 26 is mounted on a plate 62 and frame 14 slides out (FIG. 3) or pivots about (FIG. 4) plate 62. A stop 64 may be provided on frame 14 to prevent overextension of the frame from plate 62 and hook and pile mating fasteners 66 (e.g., VELCRO) may be used to secure frame 14 in stored pivoted position. A further embodiment of means 58 for mounting frame 14 to advertising display device 12 in a manner that permits the frame to be moved between a stored and in-use position is shown in FIGS. 5–6. As shown therein, frame 14 is attached to sign 26 with a pivoting hinge 68 that permits frame to rotate on hinge 68 about an axis 70 at a lower front corner of sign 26 and then to swing on hinge 68 perpendicular to sign 26. Other means 58 for accomplishing the above-mentioned function will occur to those skilled in the art.

In use, with frame generally parallel to shelf 18 and with fresnel lens 16 generally horizontal between the printed matter on package 54 and the viewer, the printed matter is magnified, making it relatively easy for a person with vision impairment to read. It will be noted that frame 14 is shallow such that it does not block the light reaching the object being magnified. This is important as persons with vision impairment are drastically affected if the light is dim. Point-of-purchase display 10 provides a benefit to the customer. It is readily available for use when the need arises and can be used without embarrassment. Even through a customer may use fresnel lens 16 for a different or even a competing product, he or she cannot totally avoid being influenced by the sponsor's advertising message on sign 26 because of the goodwill generated by providing the magnifier.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A point-of-purchase display comprising:
    an advertising display device adapted for attachment to a store shelf,
    a fresnel lens in a frame for magnifying printed matter on a package with the fresnel lens between the printed matter and a viewer,
    a means for mounting the frame on the advertising display device such that the frame is generally parallel to the shelf and angled towards a viewer.

2. The point-of-purchase display of claim 1 wherein the fresnel lens has a first smooth side nearest the eyes of a viewer and an under-surface formed with prismatic grooves nearest the printed matter being magnified.

3. The point-of-purchase display of claim 2 wherein the fresnel lens magnifies a package four inches or less in length such that the entire package can be seen within the fresnel lens.

4. The point-of-purchase display of claim 3 wherein the fresnel lens has a magnification of 1.5 times or less and is large enough that the entire package is visible through the lens.

5. A point-of-purchase display comprising:
    an advertising display device adapted for attachment to a price channel at the front of a shelf,
    a fresnel lens in a frame for magnifying printed matter on a package with the fresnel lens between the printed matter and a viewer,
    a means for mounting the frame on the advertising display device for movement between a first stored position and a second in-use position, said frame being generally parallel to the shelf and angled towards a viewer in the in-use position.

6. The point-of-purchase display of claim 5 wherein the advertising display device is attached to the shelf with a ball and socket joint held together with an elastic band.

7. The point-of-purchase display of claim 5 wherein the fresnel lens has a first smooth side nearest the eyes of a viewer and an under-surface formed with prismatic grooves nearest the printed matter being magnified.

8. The point-of-purchase display of claim 7 wherein the fresnel lens magnifies a package four inches or less in length such that the entire package can be seen within the fresnel lens.

9. The point-of-purchase display of claim 8 wherein the fresnel lens has a magnification of 1.5 times or less and is large enough that the entire package is visible through the lens.

10. The point-of-purchase display of claim 5 wherein the fresnel lens is generally rectangular and formed of rigid vinyl.

* * * * *